(12) United States Patent
Dellach et al.

(10) Patent No.: US 7,779,716 B2
(45) Date of Patent: Aug. 24, 2010

(54) QUICK DISCONNECT TOOLING APPARATUS

(75) Inventors: Jeffery J. Dellach, Macomb, MI (US); Kenneth P. Dellach, Shelby Township, MI (US); Donald van Zile, III, New Baltimore, MI (US); Henry J. Brohl, III, Macomb, MI (US); Michael L. Gloden, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1342 days.

(21) Appl. No.: 11/256,460

(22) Filed: Oct. 21, 2005

(65) Prior Publication Data

US 2006/0088367 A1    Apr. 27, 2006

Related U.S. Application Data

(60) Provisional application No. 60/621,398, filed on Oct. 22, 2004.

(51) Int. Cl.
  *B25J 17/00*   (2006.01)
  *B25J 17/02*   (2006.01)
  *B25J 18/00*   (2006.01)
  *B66C 1/00*    (2006.01)
  *B66C 3/00*    (2006.01)
(52) U.S. Cl. ............ 74/490.02; 414/738; 414/740
(58) Field of Classification Search ............ 74/490.01, 74/490.02, 490.05, 490.06; 414/738, 739, 414/740, 694
See application file for complete search history.

(56) References Cited

U.S. PATENT DOCUMENTS 2,803,473 A  *  8/1957  Hohmann  ............... 137/614.04

(Continued)

FOREIGN PATENT DOCUMENTS

DE    4010070    11/1991

(Continued)

OTHER PUBLICATIONS

International Search Report and Written Opinion dated Mar. 1, 2006 from the corresponding PCT application.

*Primary Examiner*—Thomas R Hannon
*Assistant Examiner*—Justin Krause
(74) *Attorney, Agent, or Firm*—Coats & Bennett, P.L.L.C.

(57) ABSTRACT

A quick disconnect tooling apparatus for releasably latching an end effector tool to a manipulator. The present invention provides a base module connectable to a manipulator, and a tool module connectable to the end effector tool. A power source coupling has a first portion coupled to the base module, and a second portion coupled to the tool module, wherein the first and second portions of the power source coupling may cooperatively engage one another to allow for the passing of power between the manipulator and the end effector tool. A releasable latch is connected to the base module and is moveable between a latched position, wherein the latch cooperatively engages a latch pin connected to the tool module to secure the tool module to the base module and allow the first and second portions of the power source coupling to communicate with one another, and an unlatched position, wherein the releasable latch does not engage the latch pin thereby allowing the base module and the tool module to be disconnected and the first and second portions of the power source coupling to be disconnected.

12 Claims, 11 Drawing Sheets

U.S. PATENT DOCUMENTS

| | | | |
|---|---|---|---|
| 3,661,408 A * | 5/1972 | Gibbons | 285/18 |
| 4,520,550 A | 6/1985 | Dunn et al. | |
| 4,621,854 A | 11/1986 | Boley et al. | 294/88 |
| 4,624,043 A | 11/1986 | Bennett | |
| 4,636,135 A | 1/1987 | Bancon | |
| 4,664,588 A | 5/1987 | Newell et al. | 414/730 |
| 4,679,956 A | 7/1987 | Douglas et al. | |
| 4,784,421 A * | 11/1988 | Alvite' | 294/86.4 |
| 4,793,053 A | 12/1988 | Zuccaro et al. | |
| 4,875,275 A | 10/1989 | Hutchinson et al. | 29/568 |
| 4,938,651 A * | 7/1990 | Gilmor et al. | 414/694 |
| 4,990,022 A * | 2/1991 | Watanabe et al. | 403/349 |
| 5,044,063 A | 9/1991 | Voellmer | |
| 5,222,854 A | 6/1993 | Blatt et al. | |
| 5,360,313 A * | 11/1994 | Gilmore et al. | 414/694 |
| 5,382,110 A * | 1/1995 | Perotto et al. | 403/322.3 |
| 5,452,981 A | 9/1995 | Crorey et al. | |
| 5,782,571 A | 7/1998 | Hufford et al. | |
| 5,993,365 A | 11/1999 | Stagnitto et al. | |
| 6,398,279 B1 | 6/2002 | Kikut | |
| 6,569,070 B1 | 5/2003 | Harrington et al. | |

FOREIGN PATENT DOCUMENTS

| | | |
|---|---|---|
| DE | 19721824 | 12/1998 |
| JP | 04164587 | 6/1992 |

* cited by examiner

QUICK DISCONNECT TOOLING APPARATUS

The following patent application claims priority of provisional patent application Ser. No. 60/621,398 filed Oct. 22, 2004.

FIELD OF THE INVENTION

The present invention relates to a quick disconnect tooling apparatus, and more particularly, a quick disconnect tooling apparatus that allows for the releasable latching of an end effector tool to a manipulator.

BACKGROUND OF THE INVENTION

With the advent and advancement of robotic technology, robots are now being relied upon to perform a variety of repetitive tasks in the manufacturing industry. To accomplish these tasks, robots are equipped with manipulative arms which are able to perform certain routine manual or manipulative tasks using various end effector tooling. For example, robots have shown dexterity in performing such exemplary tasks as welding, painting, deburring, routing, assembling, handling, and working on objects involving specific tolerances.

The programmability of a robot provides the flexibility to allow a single, common robot to perform all of the tasks noted above. However, in order to perform these tasks with a common robot, the end effector tooling must change with the function to be performed or the object to be handled. For instance, the end effector tooling may require vacuum cups to handle and move sheet metal parts. In another instance, the end effector may comprise pneumatic clamps for securing workpieces in a particular position so that they may be properly machined. Other end effector tooling may utilize welder guns for the welding of certain metallic workpieces. Other end effector tooling may utilize pneumatic pin locators for locating locator holes in a certain workpiece. Thus, in order to utilize the full potential of a robot, it is necessary to be able to change the end effector tooling in a somewhat efficient manner. Efficiency may thereby be increased by providing a quick and simple apparatus by which to change the end effector tooling on the robot.

Various methods have been developed to connect the end effector tooling to a robot. For instance, it is well known to bolt and unbolt the end effector tooling to the robot. The use of a threaded bolt is a time-consuming and potentially complicated method of attaching such end effector tooling to a robot, and therefore, such a method is undesirable in a production environment. Other various disconnects have utilized complicated and/or expensive systems by which to ensure a quick disconnect between the end effector tooling and the robot. These systems typically have the disadvantage of being expensive and high in maintenance thereby making them undesirable in a production environment. Other quick disconnect couplings have been developed which may be attached in various misaligned positions. Thus, a worker may improperly align the two halves of the coupling thereby creating inefficiencies that are undesirable in a production environment.

Some end effector tooling requires the use of a power source. For instance, pneumatic clamps require the supply of a pressurized power source, vacuum cups require a supply of vacuum, welding guns require the supply of electrical power, etc. Therefore, when disconnecting end effector tooling, couplings must be provided for connecting and disconnecting such power sources at the point of the quick disconnect coupling. Many of these power source couplings remain exposed when the end effector tooling is connected to the robot thereby allowing the power source couplings to become potentially damaged while in use in the production environment. If such power source couplings are damaged, they must then be replaced, thereby creating further inefficiencies in the production environment.

Therefore, it would be desirable to provide a simple and inexpensive quick disconnect that allows for the quick and efficient coupling of an end effector to a manipulator. It would also be desirable to provide a quick disconnect coupling that could only be coupled in one particular position. It would also be desirable to provide a quick disconnect coupling that protected power source couplings extending from the manipulator to the end effector.

SUMMARY OF THE INVENTION

The present invention relates to a quick disconnect tooling apparatus for releasably connecting an end effector tool to a manipulator, such as a robot. The present invention provides a base module connectable to a manipulator, and a tool module connectable to an end effector tool. A power source coupling provides a first portion coupled to the base module and a second portion coupled to the tool module, wherein the first and second portions of the power source coupling cooperatively engage one another to allow for the passing of power between the base module and the tool module. A releasable latch is connected to the base module, and a latch pin is connected to the tool module. The releasable latch is movable between a latched position, wherein the latch cooperatively engages the latch pin to secure the tool module to the base module and allow the first and second portions of the power source coupling to cooperatively engage one another, and an unlatched position, wherein the base module and the tool module may be disconnected thereby disengaging the first and second portions of the power source coupling. A safety latch may be connected to the base module and may move between a locked position, wherein the safety latch prevents the tool module and the base module from moving toward the unlatched position, and an unlocked position, wherein the safety latch allows the base module and the tool module to move toward the unlatched position.

BRIEF DESCRIPTION OF THE DRAWINGS

The description herein makes reference to the accompanying drawings wherein like referenced numerals refer to like parts throughout several views and wherein.

DESCRIPTION OF THE PREFERRED EMBODIMENT

Referring to the drawings, the present invention will now be described in detail with reference to the disclosed embodiment.

Figure 1:
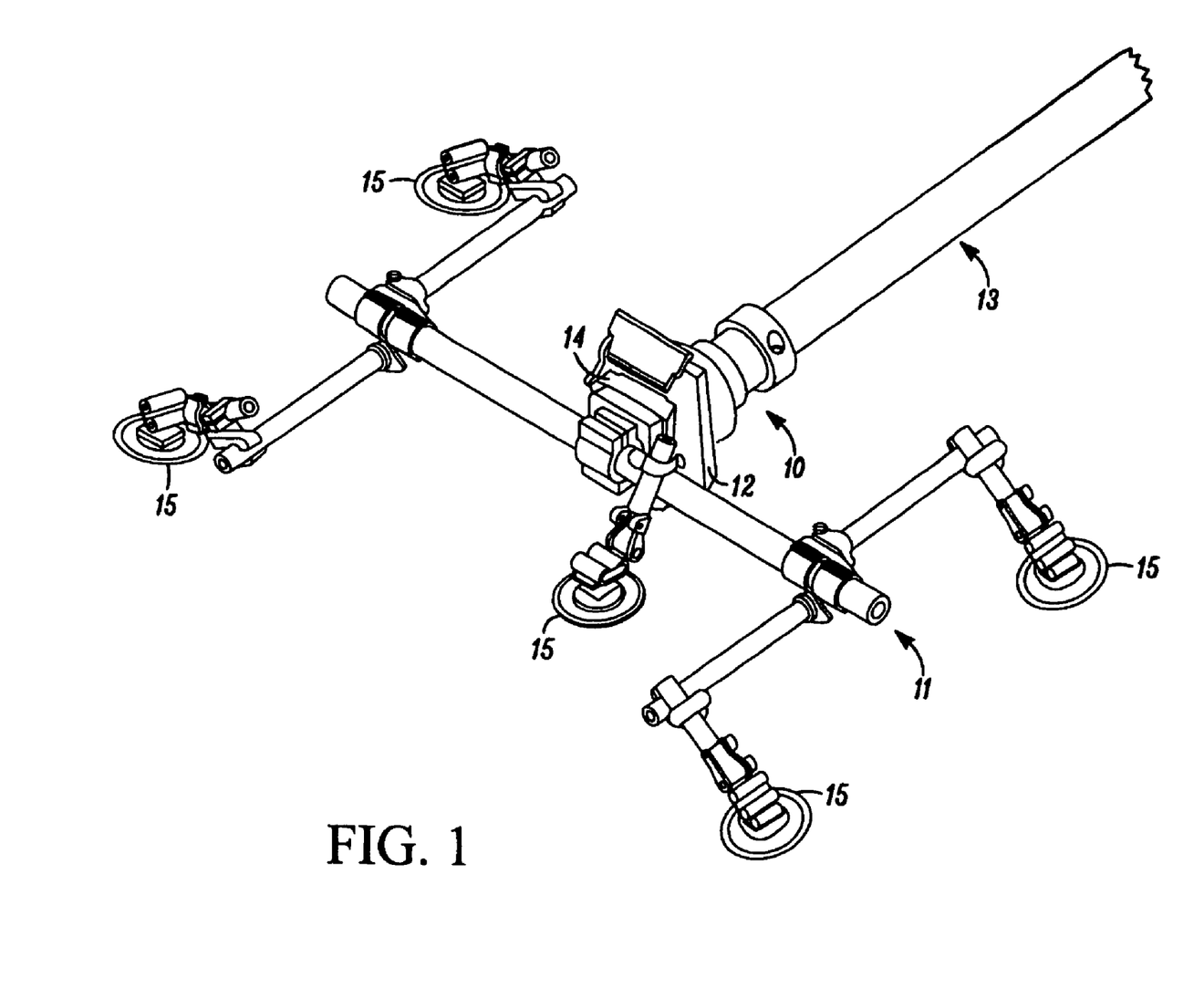
FIG. 1 is a perspective view of the quick disconnect tooling apparatus of the present invention being utilized with a manipulator and an end effector tool.

FIG. 1 illustrates a quick disconnect tooling apparatus 10 for connecting an end effector tool 11, such as vacuum cups 15, power clamps (not shown), grippers (not shown), gun welders (not shown), etc., to a manipulator 13, which may be connected to a robotic arm assembly (not shown). The quick disconnect tooling apparatus 10 of the present invention includes a base module 12 that is connectable to the manipulator 13, and a tool module 14 that is connectable to the end effector tool 11. As seen in FIGS. 2-8, the base module 12 provides a latch 16 that releasably engages a latch pin 18 on the tool module 14 to releasably latch the tool module 14 to the base module 12. The apparatus 10 further provides a power source coupling 20 having a first portion 22 coupled to the base module 12 and a second portion 24 coupled to the tool module 14. The power source coupling 20 directs and communicates power, such as pressurized air or vacuum and electricity, from the manipulator 13 to the end effector tool 11. To engage and disengage the end effector tool 11 from the manipulator 13, the releasable latch 16 is movable between a latched position, wherein the latch 16 cooperatively engages the latch pin 18 to secure the tool module 14 to the base module 12 and allow the first portion 22 and the second portion 24 of the power source coupling 20 to communicate with one another thereby allowing power to pass through the apparatus 10, and an unlatched position, wherein the base module 12 and the tool module 14 may be disconnected from one another thereby allowing the first portion 22 and the second portion 24 of the power source coupling 20 to be disengaged. The quick disconnect tooling apparatus 10 provides a quick and efficient means by which to secure the end effector tooling 11 to the manipulator 13 while ensuring that all power source connections are maintained.

As seen in FIGS. 2, 3, and 5-8, the base module 12 is constructed through the use of a pair of substantially similar mounting plates 26 that are substantially parallel to one another. The mounting plates 26 are fabricated from steel or any other high-strength, hard material. A substantially rectangular mounting block 28 fabricated from aluminum or any other lightweight, high-strength material is mounted between the two mounting plates 26 through the use of fasteners 30. The fasteners 30 extend through apertures provided in the mounting plates 26 and are connected to the mounting block 28. The mounting block 28 also has four apertures 32 which extend from the rear to the front of the mounting block 28 through the four corners of the mounting block 28. Threaded fasteners (not shown) extend through the apertures 32 and into corresponding apertures provided in the manipulator 13 to connect the base module 12 to the manipulator 13.

Figure 8:
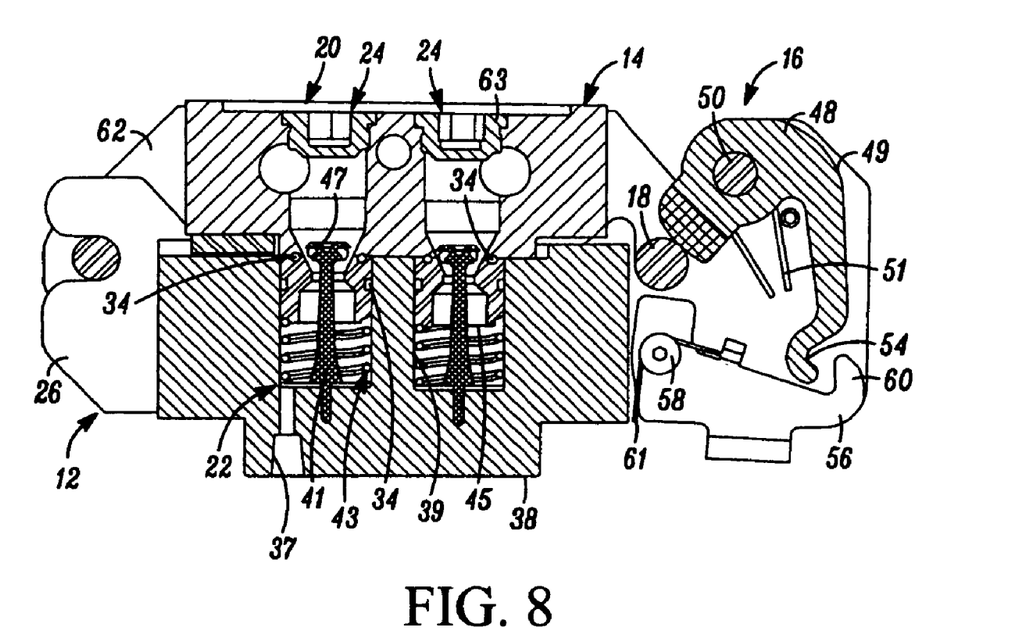
FIG. 8 is a sectional view in the direction of arrows 8-8 in FIG. 7 of the quick disconnect tooling apparatus of the present invention.

The mounting block 28 of the base module 12 also houses the first portion 22 of the power source coupling 20. The first portion 22 of the power source coupling 20 provides four air ports 36 on a back side 38 of the mounting block 28 of the base module 12. Each air port 36 provides a passageway 37 that extends from the back side 38 of the mounting block 28 to an aperture 39 in the mounting block 28 wherein an air coupling 40 is housed and accessed from a front side 42 of the mounting block 28. The four air couplings 40 each provide a fixed valve stem 41 that is connected to the mounting block 28 and is disposed within and extends outward from the aperture 39 toward the front side 42 of the mounting block 28. A compression spring 43 is disposed within each aperture 39 of the mounting block 28, and each compression spring 43 engages a piston 45. Each piston 45 is slidably disposed in the aperture 39 of the mounting block 28 and is coaxially aligned with the valve stem 41. The spring 43 biases the piston 45 toward the front side 42 of the mounting block 28. The piston 45 may move between a closed position, wherein the piston 45 is biased by the spring 43 to engage a head 47 of the valve stem 41 to prevent pressurized air or vacuum from passing through the mounting block 28, and an open position, wherein the piston 45 is displaced inward by the mounting block 24 of tool module 14 thereby disengaging the head 47 of the valve stem 41 and opening the passageway 37 and aperture 39 to allow pressurized air or vacuum to pass through the base module 12 to the tool module 14, as will be further described below. Seal rings 34 are provided on the piston 45 and the head 47 of the valve stem 41 to prevent pressurized air or vacuum from passing between the piston 45 and the mounting block 28 of the base module 12 in all positions, from passing between the piston 45 and the valve stem 41 in the closed position, and from passing between the piston 45 and the mounting block 24 of the tool module 14 in the open position.

Figure 12:
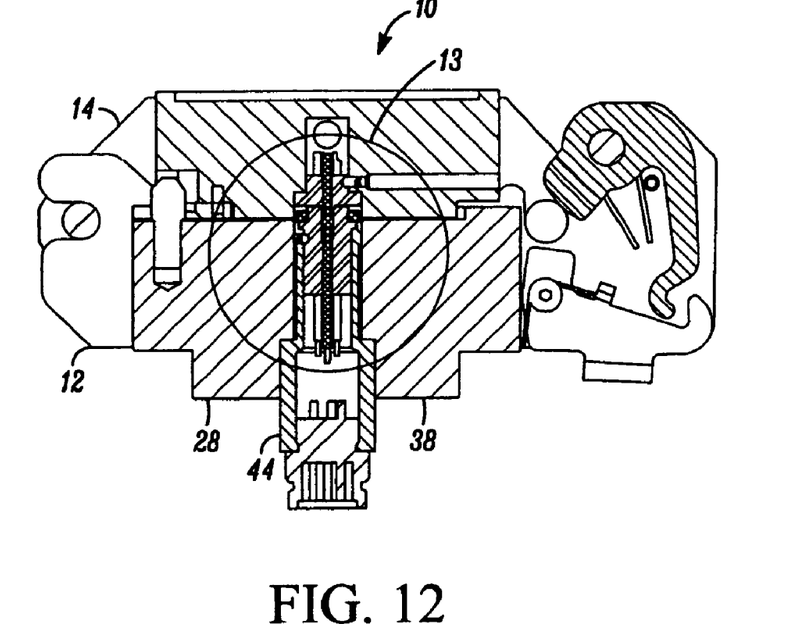
FIG. 12 is a sectional view in the direction of arrows 12-12 in FIG. 7 of the quick disconnect tooling apparatus of the present invention.
Figure 13:
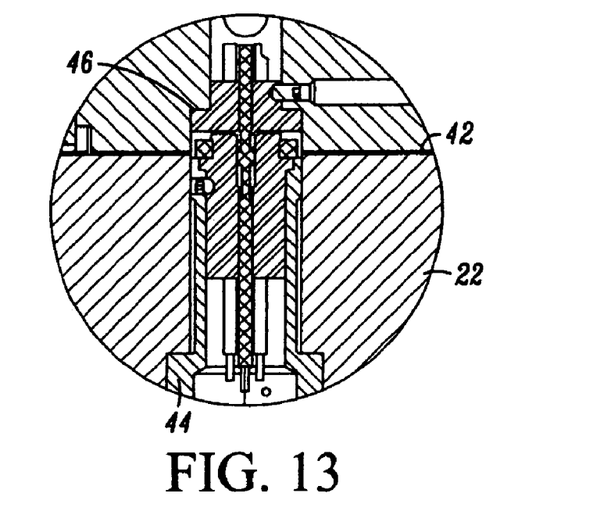
FIG. 13 is a cut-away view of the electrical module of the quick disconnect tooling apparatus of the present invention.

An electrical module 44 may also be connected to the back side 38 of the mounting block 28 of the base module 12, as seen in FIGS. 12-13. The electrical module 44 extends through the mounting block 28 wherein an electrical connector is provided on the front side 42 of the mounting block 28. The electrical module 44 and the electrical connector may comprise a conventional multi-pin electrical cable connector. The air ports 36 and the electrical module 44 on the back side 38 of the mounting block 28 of the base module 12 are adapted to be connectable to a pressurized air or vacuum source (not shown) and an electrical power source (not shown), respectively, which are provided through the manipulator 13.

Figure 15:
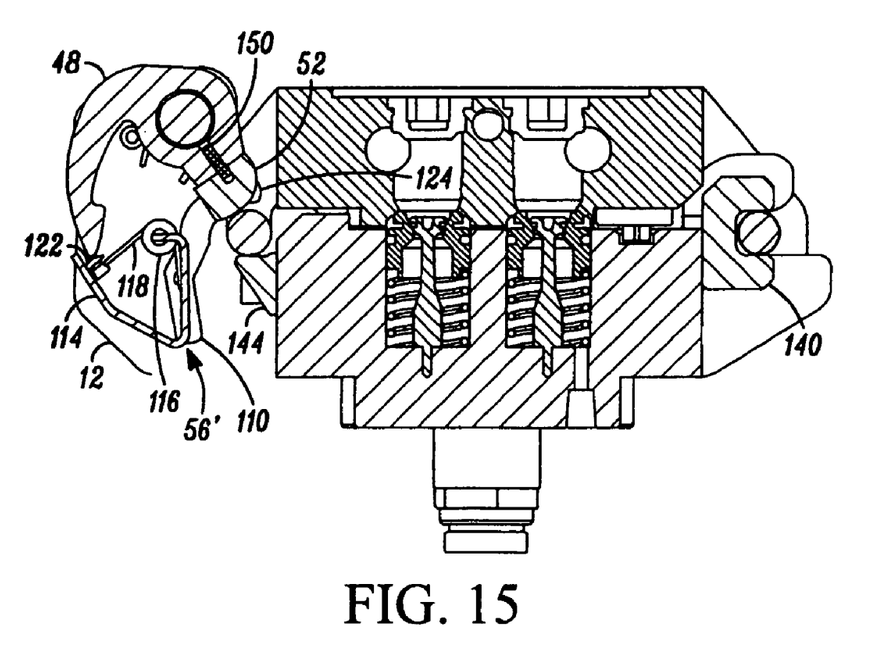
FIG. 15 is a sectional view in the direction of arrows 15-15 in FIG. 14 showing the additional alternative embodiment of the safety latch and release handle of the quick disconnect tooling apparatus of the present invention.

To releasably latch the tool module 14 to the base module 12, the releasable latch 16 provides a release handle 48 that is pivotally connected to a handle pin 50 which is mounted to and extends between the mounting plates 26 of the base module 12, as seen in FIGS. 2-8. At least one torsional spring 51 is coiled about the handle pin 50, as one end of the torsional spring 51 engages the release handle 48, and the other end of the torsional spring 51 engages a spring pin 49 connected to the mounting plates 26 of the base module 12. The torsional spring 51 biases the release handle 48 toward the latched position. The release handle 48 has somewhat of a substantially cross-sectional C-shaped configuration having a cam surface 52 formed on one end of the C-shaped configuration for engaging the latch pin 18 of the tool module 14. The cam surface 52 is fabricated from a hardened steel and may be aligned and connected to the release handle 48 through dowel rods 150, as seen in FIG. 15. A striker 54 is formed on the other end of the C-shaped configuration of the release handle 48 for engaging a safety latch 56, as seen in FIG. 8.

Figure 14:
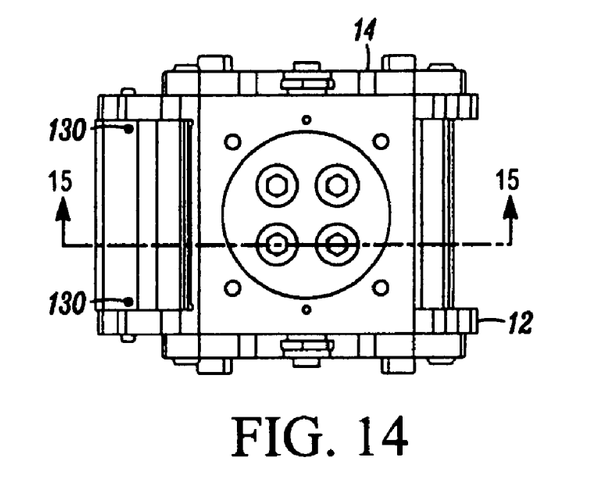
FIG. 14 is a front view of the quick disconnect tooling apparatus of the present invention utilizing an additional alternative embodiment of a safety latch and release handle.
Figure 16:
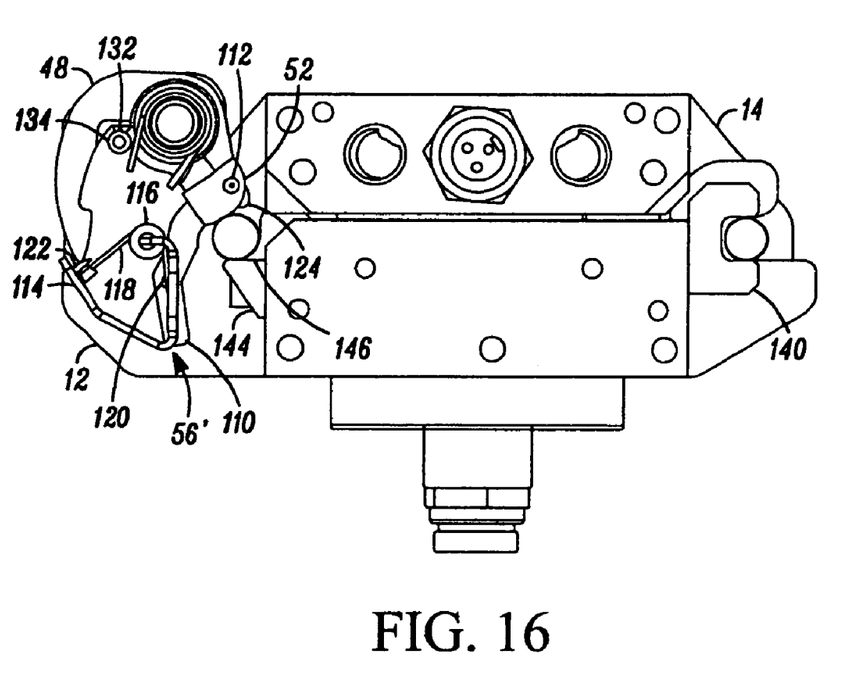
FIG. 16 is a plan side view without the mounting plate of the quick disconnect tooling apparatus of the present invention utilizing the additional alternative embodiment of the safety latch and release handle.

In another embodiment, an adjustable stop 130 may be utilized on the release handle 48 to prevent the release handle 48 from pivoting counter-clockwise beyond the latched position, as seen in FIGS. 14-16. The adjustable stop 130 comprises a pair of set screws 132 that extend through the release handle 48 on opposites sides thereof. The set screws 132 may each engage a standoff 134 that extend through and between the mounting plates 26 of the base module 12. The end of the set screws 132 engage the standoffs 134 to prevent the release handle 48 from pivoting beyond the latched position in a direction opposite of the unlatched position. The set screws 132 may be adjustably threaded in and out of the release handle 48 to provide the proper positioning of the release handle 48 in the latched position.

To prevent the releasable latch 16 from unwantedly moving counter-clockwise toward the unlatched position, the safety latch 56 is pivotally connected to an inside surface of one of the mounting plates 26 of the base module 12 through the use of a pivot pin 58, as best seen in FIG. 8. The safety latch 56 also has a substantially U-shaped cross-section and provides a catch 60 which engages the striker 54 of the release handle 48 in the latched position. The safety latch 56 may move between a locked position, wherein the catch 60 engages the striker 54 of the release handle 48 to prevent the release handle 48 from moving counter-clockwise toward the unlatched position, and an unlocked position, wherein the latch 60 is pivoted away from the striker 54 of the release handle 48 to allow the release handle 48 to pivot counter-clockwise toward the unlatched position. A torsional spring 61 is coiled about the pivot pin 58 and coupled to the safety latch 56 counter-clockwise to bias the safety latch 56 toward the locked position.

Figure 9:
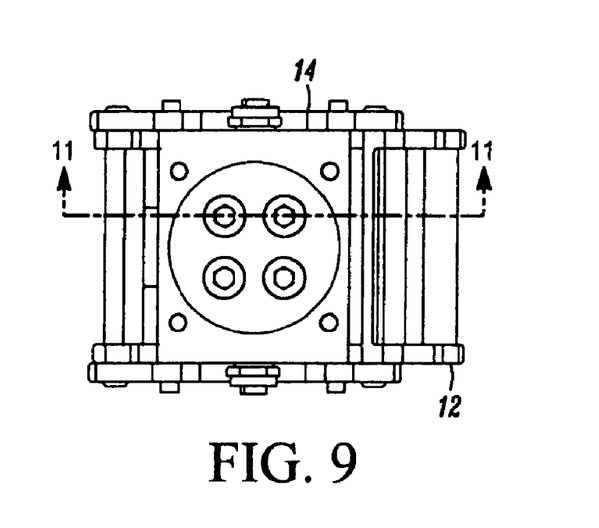
FIG. 9 is a front view of the quick disconnect tooling apparatus of the present invention utilizing an alternative embodiment of a safety latch and release handle.
Figure 10:
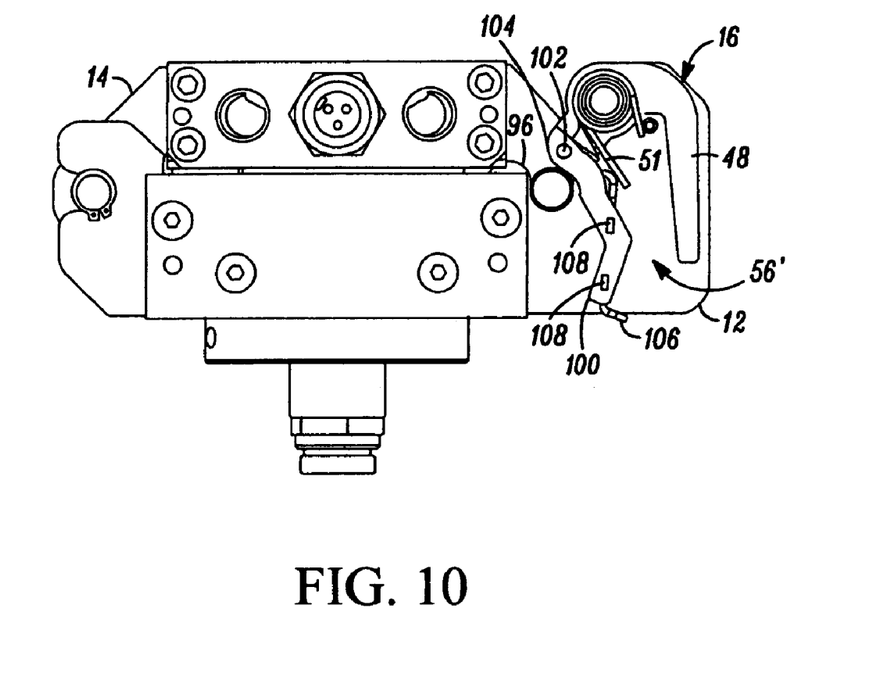
FIG. 10 is a side view of the quick disconnect tooling apparatus of the present invention utilizing the alternative embodiment of the safety latch and release handle.
Figure 11:
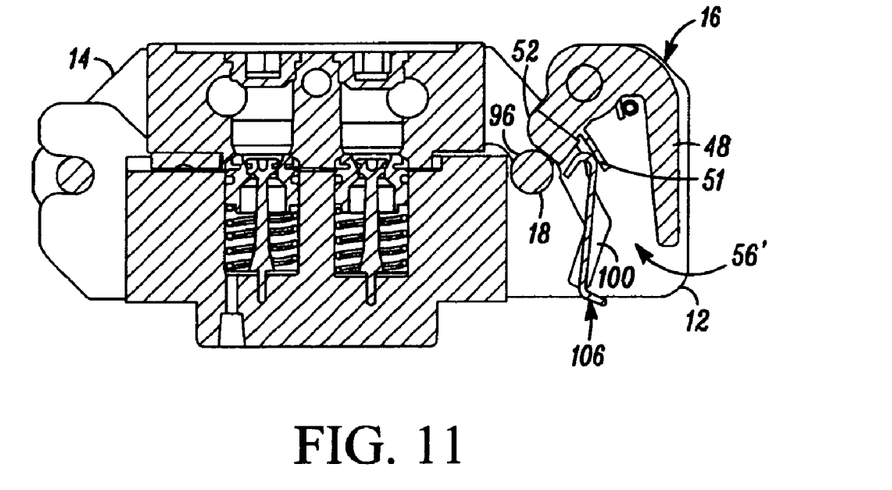
FIG. 11 is a sectional view in the direction of arrows 11-11 in FIG. 9 showing the alternative embodiment of the safety latch and release handle of the quick disconnect tooling apparatus of the present invention.

As seen in FIGS. 9-11, an alternative embodiment to the safety latch 56 is illustrated as safety latch 56'. The safety latch 56' provides a pair of substantially J-shaped pawls 100 that are pivotally connected to the ends of cam surface 52 of the release handle 48 by pivot pins 102. A support plate 106 extends between the pawls 100 to synchronize the motion of the pawls 100 and to transfer the spring biasing force from the torsional spring 51 to the pawls 100. Each of the pawls 100 has a pair of substantially rectangular apertures for which the support plate 106 provides tabs 108 that are connectably inserted therein. A portion of the support plate 106 is engaged by one end of the torsional spring 51 which biases the releasable latch 16 clockwise toward the latched position. In a locked position, the pawls 100 provide a lobe 104 that extends beyond cam surface 52 in order to engage the latch pin 18. The torsional spring 51 biases the safety latch 56' clockwise toward the locked position to ensure that the lobe 104 of the pawls 100 engages and maintains the position of the latch pin 18 in the V-shaped slots 96 of the base module 12, even when the release handle 48 is pivoted counter-clockwise toward the unlatched position. In order to move the safety latch 56' to an unlocked position, the user must rotate the end of the pawls 100 counter-clockwise toward the release handle 48 of the latch 16 against the bias of the torsional spring 51. When this occurs, the lobe 104 of the pawls 100 is rotated below cam surface 52 of the releasable latch 16. While holding the pawls 100 back toward the release handle 48 in the unlocked position, the release handle 48 and the pawls 100 may be pivoted counter-clockwise toward the unlatched position, and the latch pin 18 may be removed from the V-shaped slots 96 of the base module 12 thereby establishing the unlatched position.

As seen in FIGS. 14-16, an additional embodiment to the safety latch 56 is illustrated as safety latch 56". The safety latch 56" provides a pair of substantially J-shaped pawls 110 that are pivotally connected to the ends of cam surface 52 of the release handle 48 by pivot pins 112. An extended handle 114 having a substantially V-shaped configuration is connected to and extends between the pair of J-shaped pawls 110. The extended handle 114 extends from the J-shaped pawls 110 to the end of the release handle 48 where the end of the extended handle 114 overlaps the release handle 48. A bushing 116 is connected to the end of the extended handle 114 immediately adjacent the J-shaped pawls 110. A torsional spring 118 is coiled about the bushing 116, wherein one end of the torsional spring 118 is connected to the extended handle 114 by rivet 120. The opposite end of the torsional spring 118 extends toward the end of the release handle 48 where a bearing slide 122 is connected to the end of the torsional spring 118. The torsional spring 118 biases the safety latch 56" counter-clockwise toward the locked position by applying a spring force against the release handle 48. In the locked position, the J-shaped pawls 110 have a lobe 124 that engages and maintains the position of the latch pin 18 in the V-shaped slots 96 of the base module 12, even when the release handle 48 is pivoted clockwise toward the unlatched position. In order to move the safety latch 56" to an unlocked position, the user must pivot the end of the J-shaped pawls 110 clockwise toward the release handle 48 of the releasable latch 16 against the bias of the torsional spring 118. When this occurs, the lobe 124 of the pawls 110 is rotated below cam surface 52 of the releasable latch 16. While holding the pawls 110 back toward the release handle 48 in the unlocked position, the release handle 48 and the pawls 110 may be pivoted clockwise toward the unlatched position, and the latch pin may be removed from the V-shaped slots 96 of the base module 12 thereby establishing the unlatched position.

Figure 2:
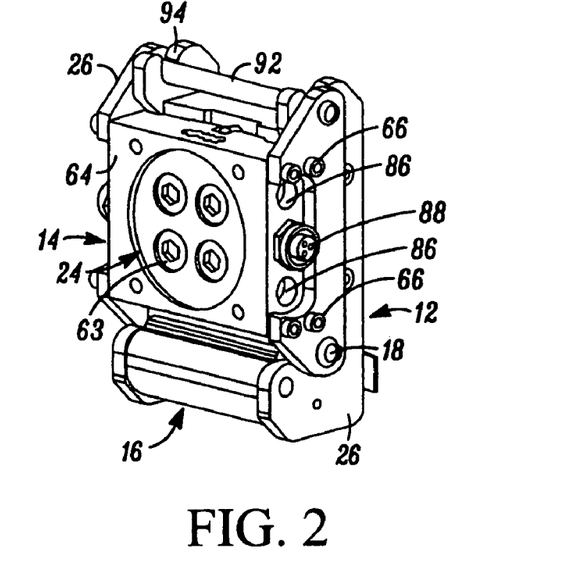
FIG. 2 is a perspective view of the quick disconnect tooling apparatus of the present invention.
Figure 4:
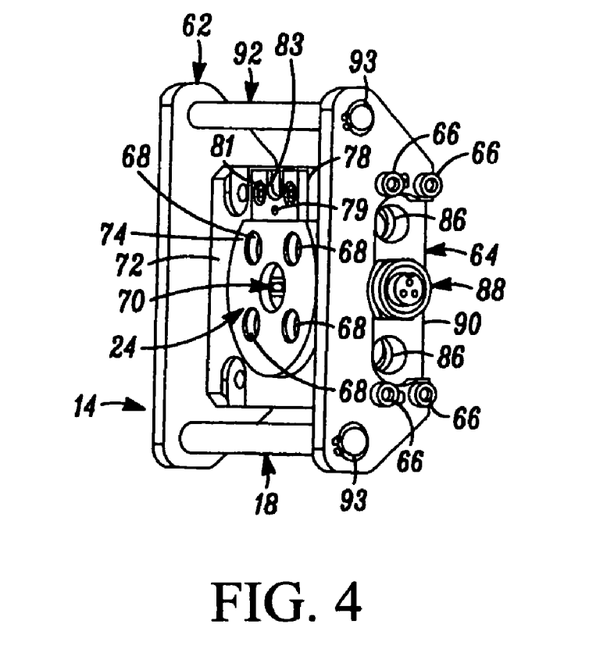
FIG. 4 is a perspective view of the tool module of the quick disconnect tooling apparatus of the present invention.
Figure 5:
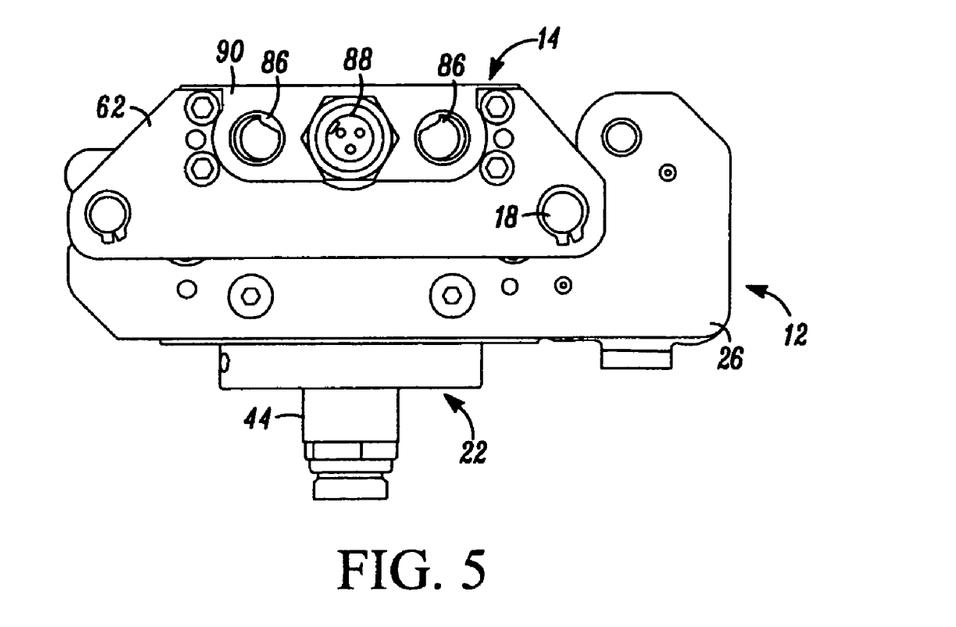
FIG. 5 is a side view of the quick disconnect tooling apparatus of the present invention.
Figure 6:
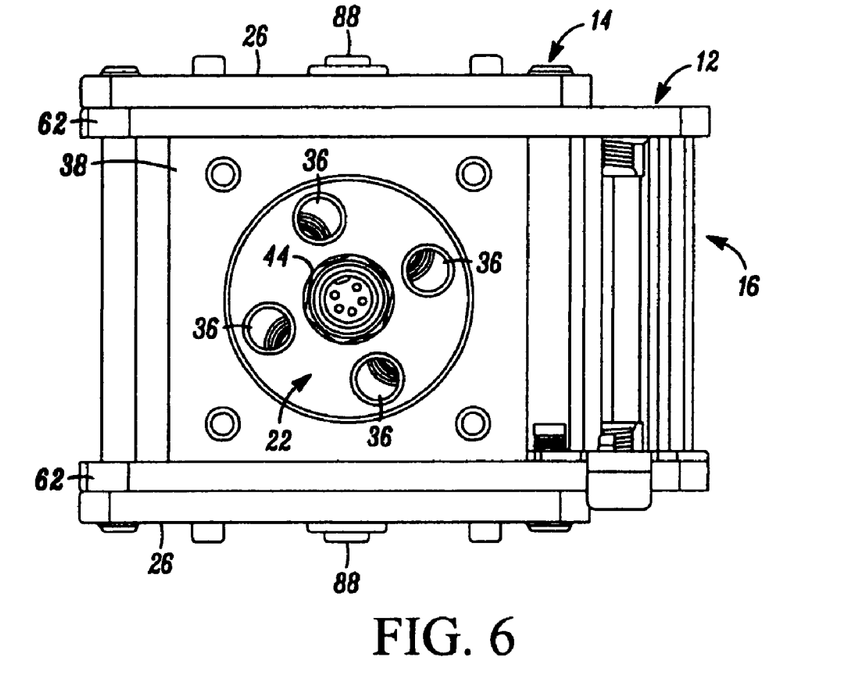
FIG. 6 is a rear view of the quick disconnect tooling apparatus of the present invention.
Figure 7:
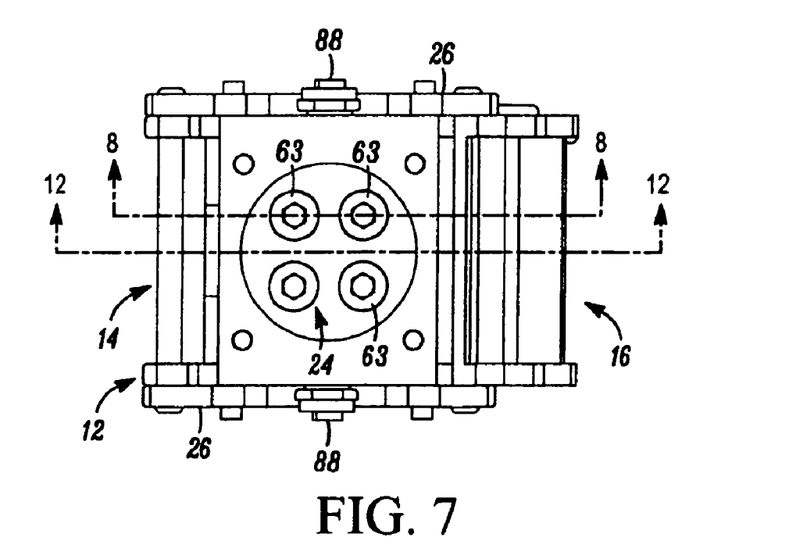
FIG. 7 is a front view of the quick disconnect tooling apparatus of the present invention.

As seen in FIGS. 2 and 48, the tool module 14 is also fabricated from a pair of similar, substantially parallel mounting plates 62 having a mounting block 64 extending therebetween. The mounting plates 62 of the tool module 14 have a substantially C-shaped configuration fabricated from steel or any other high-strength, hard material. The mounting block 64 of the tool module 14 is substantially rectangular and is fabricated from aluminum or any other high-strength, lightweight material. The mounting block 64 is connected to the mounting plates 62 through the use of dowel pins 66. The dowel pins 66 extend through apertures provided in the mounting plates 62 and are press fit into apertures provided in sides of the mounting block 64.

The mounting block 64 of the tool module 14 houses the second portion 24 of the power source coupling 20. The second portion 24 of the power source coupling 20 provides four air ports 68 for engaging the air couplings 40 of the base module 12 and communicating pressurized air or vacuum with the air ports 36 of the base module 12. The mounting block 64 of the tool module 14 is designed to engage the air couplings 40 of the base module 12, depress the piston 45 of the air couplings 40, and open the air couplings 40 to allow pressurized air or vacuum to pass therethrough. Plugs 63 may be threaded into the air ports 68 on the back side of the mounting block 64 of the tool module 14 to block the air ports 68 and create the internal passageways. If the air ports 68 are not in use, then the plugs 63 do not need to be inserted into the air ports 68.

The mounting block 64 of the tool module 14 also provides an electrical connector 70 for cooperatively engaging the electrical module 44 of the base module 12. The electrical connector 70 of the tool module 14 may be a multiple male pin connector that mates with a multiple female pin connector of the electrical module 44 of the base module 12. The air ports 68 and the electrical connector 70 of the tool module 14 are located on a front side 72 of the mounting block 64 so as to engage the front side 42 of the mounting block 28 of the base module 12.

The air ports 68 and the electrical connector 70 on the front side 72 of the mounting block 64 of the tool module 14 are in communication with air ports 86 and electrical connectors 88 provided on sides 90 of the mounting block 64 of the tool module 14. Two air ports 86 and one electrical connector 88 are provided on each of two sides 90 of the mounting block 64 of the tool module 14. These air ports 86 and electrical connectors 88 are in communication with the end effector tooling 11 to supply the necessary pressurized air or vacuum and electrical power to the end effector tool 11.

Figure 3:
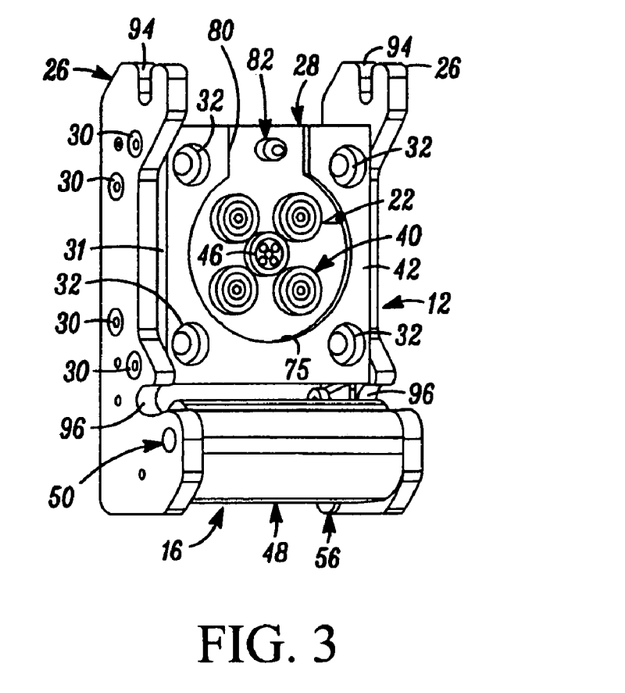
FIG. 3 is a perspective view of the base module of the quick disconnect tooling apparatus of the present invention.

In order to provide a degree of protection to the power source coupling 20, the front side 72 of the mounting block 64 of the tool module 14 provides a substantially circular, raised portion 74 which matingly engages a substantially circular recessed portion 75 on the front side 42 of the mounting block 28 of the base module 12, as seen in FIGS. 3-4 and 8. The raised portion 74 of the mounting block 64 of the tool module 14 provides apertures 68 corresponding to the air couplings 40 and the electrical coupling 46 in the mounting block 28 of the base module 12. A substantially rectangular raised portion 78 is connected to the front side 72 of the mounting block 64 of the tool module 14. The raised portion 78 is located on the mounting block 28 through the use of a dowel pin 79 and is connected to the mounting block 28 by a pair of threaded fasteners 81. An alignment pin 82 extends outward from the rectangular recessed portion 80 of the base module 12 to matingly engage a substantially U-shaped slot 83 provided in the rectangular raised portion 78 of the mounting block 64 of the tool module 14. The alignment pin 82 aids in providing the proper alignment and assembly of the tool module 14 to the base module 12.

The latch pin 18 and a hinge pin 92 are disposed between the two mounting plates 62 of the tool module 14 and at opposite ends of the tool module 14. The latch pin 18 and the hinge pin 92 extend through apertures provided in the mounting plates 62 of the tool module 14 and are maintained in position by snap rings 93. The hinge pin 92 and the latch pin 18 are substantially cylindrical and substantially parallel to one another and are both 18, 92 fabricated from steel or any other high-strength, hard material. However, the diameter of latch pin 18 is larger than hinge pin 92. To latch the tool module 14 to the base module 12, the hinge pin 92 is received by a pair of substantially V-shaped slots 94 provided at one end of each of the mounting plates 26 of the base module 12. The V-shaped slots 94 open at one end of the mounting plates 26 and have a longitudinal axis substantially parallel to a longitudinal axis of the mounting plates 26. The latch pin 18 is also received within a pair of substantially V-shaped slots 96 provided in the mounting plates 26 of the base module 12. The V-shaped slots 96 open to the front side 42 of the mounting block 28 of the base module 12 and have a longitudinal axis substantially perpendicular to the longitudinal axis of the mounting plates 26. The V-shaped slots 96 are larger than the V-shaped slots 94 such that the latch pin 18 can not fit within the U-shaped slots 94. This ensures that the base module 12 can only be coupled to the tool module 14 in one particular orientation. When the latch pin 18 is disposed within the V-shaped slots 96, the cam surface 52 of the release handle 48 extends in front of and engages the latch pin 18 to prevent the latch pin 18 from escaping the V-shaped slots 96 of the base module 12 thereby establishing the latched position.

Figure 17:
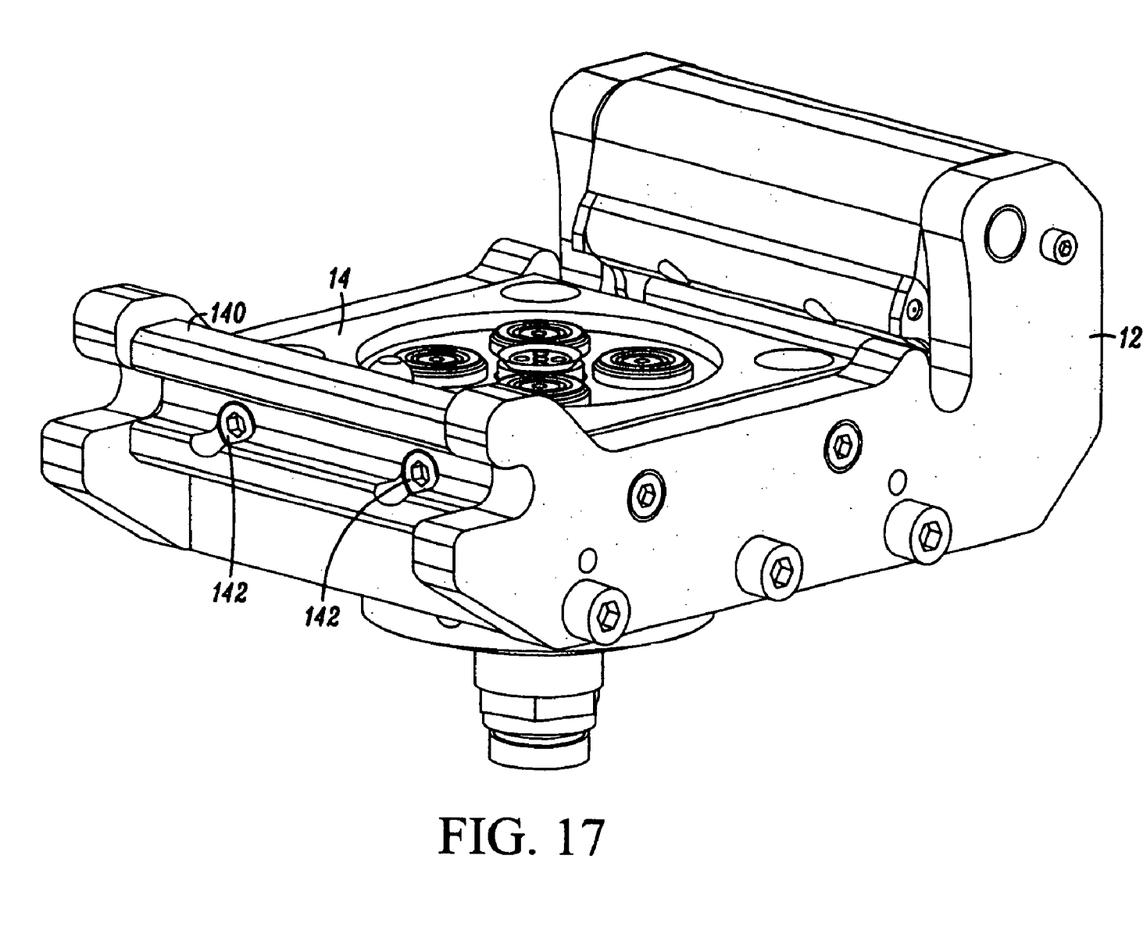
FIG. 17 is a perspective view of the U-shaped channel of the additional alternative embodiment of the quick disconnect tooling apparatus of the present invention.
Figure 18:
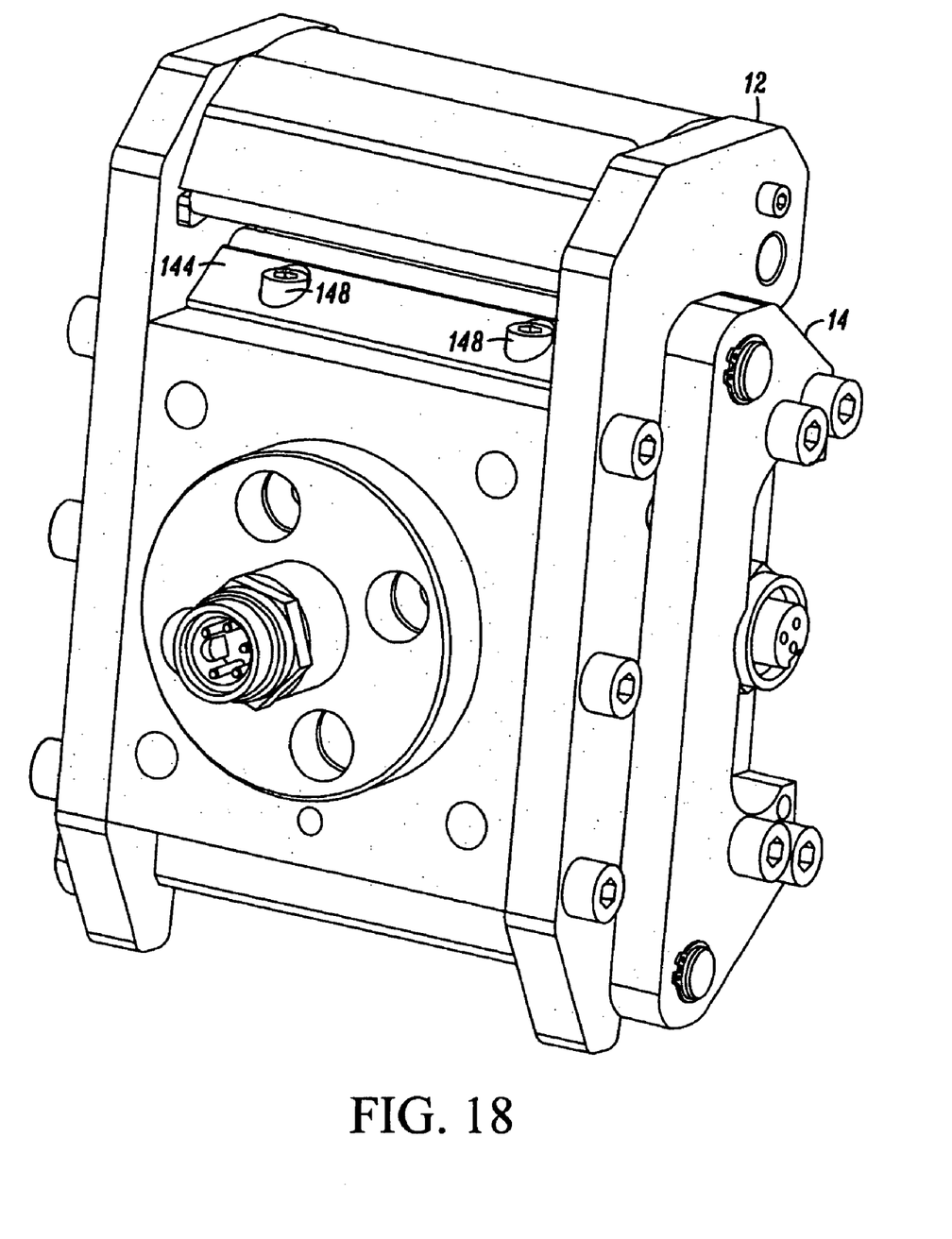
FIG. 18 is a perspective view of the ledge of the additional alternative embodiment of the quick disconnect tooling apparatus of the present invention.

In yet another embodiment, a solid U-shaped channel 140 may extend between the U-shaped slots 94 provided in the mounting plates 26 of the base module 12, as seen in FIGS. 15-17. The U-shaped channel 140 has the same U-shaped configuration as the U-shaped slots 94 so as to receive the hinge pin 92 of the tool module 14. The U-shaped channel 140 is connected to the mounting block 28 of the base module 12 through a pair of conventional fasteners 142. The U-shaped channel 140 aids in supporting the hinge pin 92 of the tool module 14.

Similarly, a ledge 144 may be provided between the U-shaped slots 96 at the opposite end of the base module 12. The ledge 144 has a substantially flat surface 146 that extends across the bottom of the U-shaped slots 96. The ledge 144 is connected to the mounting block 28 of the base module 12 through a pair of conventional fasteners 148 and aids in supporting the latch pin 18 of the tool module 14.

In operation, the base module 12 of the quick disconnect apparatus 10 is connected to a manipulator 13, and the tool module 14 of the apparatus 10 is connected to an end effector tool 11, as seen in FIGS. 1-8. The end effector tool 11 is brought in close proximity to the manipulator 13 such that the tool module 14 is placed in close proximity to the base module 12. The base module 12 is oriented such that the U-shaped slots 94 are located at the top of the base module 12, and the tool module 14 is oriented such that the hinge pin 92 is at the top of the tool module 14. The hinge pin 92 of the tool module 14 is inserted into the U-shaped slots 94 of the base module 12 until the hinge pin 92 is seated in the closed end of the U-shaped slots 94. The end effector tool 11 and the tool module 14 are pivoted downward so that the latch pin 18 is received within the U-shaped slots 96 of the base module 12. When this occurs, the cam surface 52 of the release handle 48 engages the latch pin 18 to prevent the latch pin 18 from escaping the U-shaped slots 96 of the base module 12 thereby establishing the latched position. The safety latch 56 overlaps the release handle 48 so that the striker 54 of the release handle 48 engages the catch 60 of the safety latch 56 thereby establishing the locked position by preventing the release handle 48 from unwantedly becoming released toward the unlatched position. In the other embodiments, the lobe 104, 124 on the pawls 100, 110, respectively, of safety latch 56', 56" prevents the latch pin 18 from being unwantedly removed from the U-shaped slots 96 of the base module 12 upon the unlatching of the release handle 48, as seen in FIGS. 9-16. When this occurs, corresponding air ports 36, 68 and electrical connectors 46, 70 cooperatively engage one another to allow for the supply of pressurized air or vacuum and electrical power to pass from the manipulator 13 to the end effector tool 11, as seen in FIGS. 1-8. The raised portion 74 of the mounting block 64 of the tool module 14 receives the air couplings 40 of the base module 12 in the corresponding apertures 68 of the raised portion 74. However, the apertures 68 are small enough so as to only receive the head of the valve stems 41 of the air couplings 40, and thus, the mounting block 64 of the tool module 14 engages and displaces the pistons 45 of the air couplings 40 toward the open position to allow pressurized air or vacuum to flow through the apparatus 10.

If the user wishes to change the end effector tooling 11, the safety latch 56, 56', 56'' is pivoted toward the unlocked position, and the release handle 48 is rotated toward the unlatched position by pivoting the release handle 48 on the handle pin 50. The cam surface 52 of the release handle is released from the latch pin 18 of the tool module 12, and the latch pin 18 is pivoted outwardly from the U-shaped slots 96 of the base module 12. Once the latch pin 18 is removed from the U-shaped slots 96, the tool module 12 is moved to remove the hinge pin 92 from the U-shaped slots 94 of the base module 12. Once the end effector tooling 11 is removed, the piston 45 biases toward the closed position, thereby preventing pressurized air or vacuum from passing through the base module 12. A new end effector tool may then be utilized to replace the previous end effector tooling 11. The steps noted above may be repeated to replace the new end effector tooling with different end effector tooling.

The above-noted steps of operation are understood to be manually performed; however, it should be appreciated that one skilled in the art would anticipate that such steps of operation could be automatically performed.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is performed under the law.

The operation of certain components of the quick disconnect tooling apparatus 10 are described herein, with reference to the drawing figures, using reference directions, such as horizontal, vertical, clockwise, counter-clockwise, and the like. Such directional references are for explanatory purposes only, and relate only to orientation of parts in the specifically referenced drawing figure(s). The terms are not limiting, and do not restrict the quick disconnect tooling apparatus 10 to operation in any particular configuration or orientation.

What is claimed is:

1. A manually actuated quick disconnect tooling apparatus for releasably latching an end effector tool to a manipulator, comprising:
   a base module having at least one first slot and at least one second slot, the base module connectable to the manipulator;
   a tool module having a hinge pin extending across one side of said tool module and operative to be received by said first slot and a latch pin extending across the opposite side of said tool module and operative to be received by said second slot, the tool module connectable to the end effector tool;
   at least one power source coupling having a first portion coupled to said base module and a second portion coupled to said tool module wherein said first and second portions cooperatively engage one another to allow for the passing of power between the manipulator and the end effector tool; and
   a releasable latch connected to said base module and manually moveable between a latched position, wherein said latch cooperatively engages said latch pin to secure said latch pin in said second slot, so as to secure said tool module to said base module and allow said first and second portions of said power source coupling to communicate, and an unlatched position, wherein said latch does not engage said latch pin thereby allowing said base module and said tool module to be disconnected and said first and second portions of said power source coupling to be disconnected.

2. The quick disconnect tooling apparatus stated in claim 1, wherein said at least one power source coupling further comprises:
   at least one air valve mounted in one of said base module and said tool module, and said at least one air valve moving between an open position, wherein the other of said base module and said tool module engages said at least one air valve to allow pressurized air or vacuum to flow through said base module and said tool module, and a closed position, wherein said other of said base module and said tool module does not engage said at least one air valve thereby allowing said at least one air valve to bias toward a closed position to prevent said pressurized air or vacuum from passing through said base module and said tool module.

3. The quick disconnect tooling apparatus stated in claim 1, wherein said at least one power source coupling further comprises:
   at least one electrical connector having a female connector in one of said base module and said tool module, and a male connector in said other of said base module and said tool module, wherein said male and female connectors engage one another in said latched position to allow electrical power to flow between said base module and said tool module.

4. The quick disconnect tooling apparatus stated in claim 1, further comprising:
   an alignment device having a pin connected to and extending from one of said base module and said tool module, and a recess formed on the other of said base module and said tool module for receiving said pin to ensure a single assembled configuration of said base module to said tool module.

5. The quick disconnect tooling apparatus stated in claim 1, wherein said releasable latch further comprises:
   a release handle pivotally connected to said base module and having a cam surface for engaging said latch pin in the latched position; and
   a torsional spring coupled to said release handle for biasing said release handle toward said latched position.

6. The quick disconnect tooling apparatus stated in claim 1, wherein:
   said first and second slots are different sizes;
   said hinge pin has a different diameter than said latch pin; and
   said first slot is sized to receive said hinge pin and said second slot is sized to receive said latch pin.

7. A manually actuated quick disconnect tooling apparatus for releasably latching an end effector tool to a manipulator, comprising:
   a base module connectable to the manipulator, and said base module having a mounting block and at least one first slot and at least one second slot;
   a tool module connectable to the end effector tool, and said tool module having a mounting block and a hinge pin extending across one side of said tool module and operative to be received by said first slot and a latch pin extending across the opposite side of said tool module and operative to be received by said second slot;

at least one power source coupling having a first portion housed within said mounting block of said base module and a second portion housed within said mounting block of said tool module wherein said first and second portions of said power source coupling may cooperatively engage one another to allow for the passing of power between the manipulator and the end effector; and a releasable latch pivotally connected to said base module, and said releasable latch manually pivotal between a latched position, wherein said latch cooperatively engages said latch pin to secure said latch pin in said second slot, so as to secure said tool module to said base module and allow said first and second portions of said power source coupling to communicate with one another, and an unlatched position, wherein said latch does not engage said latch pin, thereby allowing said base module and said tool module to be disconnected and allowing said first and second portions of said power source coupling to be disconnected.

8. The quick disconnect tooling apparatus stated in claim 7 wherein said at least one power source coupling further comprises:

at least one air valve housed within said mounting block of said base module, and said air valve moving between an open position, wherein said mounting block of said tool module engages said air valve to allow pressurized air or vacuum to flow through said base module and said tool module, and a closed position, wherein said mounting block of said tool module does not engage said air valve, thereby allowing said air valve to prevent pressurized air or vacuum from passing through said base module to said tool module.

9. The quick disconnect tooling apparatus stated in claim 7, wherein said at least one power source coupling, further comprises:

at least one electrical connector having a female connector in one of said mounting block of said base module and said tool module, and a male connector in said other of said mounting block of said base module and said tool module, wherein said male and female connectors engage one another in said latched position to allow electrical power to flow between said base module and said tool module.

10. The quick disconnect tooling apparatus stated in claim 7, further comprising:

an alignment device having a pin connected to and extending from one of said base module and said tool module in a non-symmetrical location relative to said one of said base module and said tool module, and a recess formed on the other of said base module and said tool module for receiving said pin to provide proper alignment of said base module to said tool module.

11. The quick disconnect tooling apparatus stated in claim 7, wherein said releasable latch further comprises:

a release handle pivotally connected to said base module and having a cam surface for engaging said latch pin in said latched position; and a torsional spring coupled to said release handle for biasing said release handle toward said latched position.

12. The quick disconnect tooling apparatus stated in claim 7, wherein:

said first slot is substantially vertical oriented; and said second slot is substantially horizontal oriented and wherein said vertical and horizontal slots, as well as said latch pin and said hinge pin, are different sizes to ensure a predetermined orientation of said base module and said tool module.

* * * * *